US011603901B2

(12) United States Patent
Zegveld et al.

(10) Patent No.: US 11,603,901 B2
(45) Date of Patent: Mar. 14, 2023

(54) MOUNTING ASSEMBLIES AS WELL AS GAS SPRING AND DAMPER ASSEMBLIES AND SUSPENSION SYSTEMS INCLUDING SAME

(71) Applicant: Firestone Industrial Products Company, LLC, Nashville, TN (US)

(72) Inventors: Rutger Zegveld, Groesbeek (NL); Jan van Aartsen, Arnhem (NL)

(73) Assignee: Firestone Industrial Products Company, LLC, Nashville, TN (US)

( * ) Notice: Subject to any disclaimer, the term of this patent is extended or adjusted under 35 U.S.C. 154(b) by 0 days.

(21) Appl. No.: 17/631,779

(22) PCT Filed: Aug. 4, 2020

(86) PCT No.: PCT/US2020/044811
§ 371 (c)(1),
(2) Date: Jan. 31, 2022

(87) PCT Pub. No.: WO2021/026106
PCT Pub. Date: Feb. 11, 2021

(65) Prior Publication Data
US 2022/0275848 A1    Sep. 1, 2022

Related U.S. Application Data

(60) Provisional application No. 62/883,297, filed on Aug. 6, 2019.

(51) Int. Cl.
*F16F 9/54* (2006.01)
*B60G 13/00* (2006.01)
(Continued)

(52) U.S. Cl.
CPC .............. *F16F 9/54* (2013.01); *B60G 13/003* (2013.01); *B60G 15/067* (2013.01); *B60G 15/14* (2013.01);
(Continued)

(58) Field of Classification Search
CPC ..... F16F 9/54; F16F 9/84; F16C 17/04; F16C 2326/05; F16C 2361/53; B60G 15/14;
(Continued)

(56) References Cited

U.S. PATENT DOCUMENTS

| 5,009,401 A | * | 4/1991 | Weitzenhof | ............... F16F 9/05 280/124.157 |
| 5,487,535 A | * | 1/1996 | Carter | ....................... F16F 9/58 267/293 |

(Continued)

FOREIGN PATENT DOCUMENTS

| CN | 103899699 B | 3/2016 |
| CN | 103660832-8 | 6/2017 |

(Continued)

OTHER PUBLICATIONS

International Search Report and Written Opinion dated Nov. 19, 2020 issued by EPO in connection with corresponding International Application No. PCT/US2020/044811.
(Continued)

*Primary Examiner* — Thomas W Irvin
(74) *Attorney, Agent, or Firm* — Thomas R. Kingsbury; Matthew P. Dugan

(57) ABSTRACT

Mounting assembly dimensioned for securement between a vehicle structure and a gas spring and damper assembly include a first end plate securable to the vehicle structure. A second end plate is attached in substantially fixed relation to the first end plate such that a mounting cavity is disposed therebetween. A connector housing is disposed within the mounting cavity and operatively connectable to the gas spring and damper assembly. A first bearing assembly is disposed between the connector housing and the first end plate and permits rotation of the connector housing relative to the first end plate while transferring forces acting longitudinally therebetween. A second bearing assembly is dis-
(Continued)

posed between the connector housing and the second end plate and permits rotation of the connector housing relative to the second end plate while transferring forces acting longitudinally therebetween. Gas spring and damper assemblies are also included.

15 Claims, 9 Drawing Sheets

(51) Int. Cl.
*B60G 15/06* (2006.01)
*B60G 15/14* (2006.01)
*F16C 17/04* (2006.01)
*F16F 9/084* (2006.01)

(52) U.S. Cl.
CPC .............. *F16C 17/04* (2013.01); *F16F 9/084* (2013.01); *B60G 2202/152* (2013.01); *B60G 2204/418* (2013.01); *B60G 2206/424* (2013.01); *B60G 2206/73* (2013.01); *F16C 2326/05* (2013.01); *F16C 2361/53* (2013.01)

(58) Field of Classification Search
CPC ........ B60G 2202/152; B60G 2204/418; B60G 2206/424; B60G 2206/73; B60G 13/003; B60G 15/067; B60G 2204/128
See application file for complete search history.

(56) References Cited

U.S. PATENT DOCUMENTS

| | | | | |
|---|---|---|---|---|
| 6,592,112 | B2* | 7/2003 | Bishop | F16F 9/54 188/321.11 |
| 6,918,701 | B2* | 7/2005 | Ueno | F16C 33/20 384/144 |
| 7,997,395 | B2* | 8/2011 | Ohkita | B60G 15/068 280/124.147 |
| 8,256,965 | B2* | 9/2012 | Kaneko | F16C 17/18 384/420 |
| 8,328,427 | B2* | 12/2012 | Kellam | F16C 33/74 384/144 |
| 8,915,648 | B2* | 12/2014 | Sakairi | F16C 33/102 384/368 |
| 9,517,671 | B2* | 12/2016 | Palka | F16F 9/54 |
| 9,701,170 | B2* | 7/2017 | DeBruler | F16F 9/585 |
| 10,422,374 | B2* | 9/2019 | Kurose | F16C 17/10 |
| 11,279,193 | B2* | 3/2022 | Werner | B60G 15/068 |
| 2002/0135111 | A1* | 9/2002 | Bishop | B60G 15/068 267/64.11 |
| 2005/0029062 | A1* | 2/2005 | Dean | B60G 15/068 267/140.11 |
| 2015/0273968 | A1 | 10/2015 | Debruler et al. | |
| 2020/0376912 | A1* | 12/2020 | Werner | F16F 9/54 |
| 2022/0063363 | A1* | 3/2022 | Kang | F16C 17/04 |

FOREIGN PATENT DOCUMENTS

| | | |
|---|---|---|
| CN | 106662186 B | 6/2019 |
| EP | 0318696 A2 | 6/1989 |
| WO | WO-2005016671 A1 | 2/2005 |
| WO | WO-2012054774 A2 | 4/2012 |

OTHER PUBLICATIONS

Chinese Office Action and Search Report issued by CNIPA dated Jun. 6, 2022 in connection with corresponding Chinese Patent Application No. 202080061093.2.
English language translation of p. 3 of Chinese Office Action.

* cited by examiner

MOUNTING ASSEMBLIES AS WELL AS GAS SPRING AND DAMPER ASSEMBLIES AND SUSPENSION SYSTEMS INCLUDING SAME

This application is the National Stage of International Application No. PCT/US2020/044811, filed on Aug. 4, 2020, which claims the benefit of priority from U.S. Provisional Patent Application No. 62/883,297, filed on Aug. 6, 2019, the subject matter of which is hereby incorporated herein by reference in its entirety.

BACKGROUND

The subject matter of the present disclosure broadly relates to the art of vehicle suspension devices and, more particularly, to mounting assemblies that are securable to vehicle structures and provide bi-directional axial rigidity while permitting relative rotation of components attached to the vehicle structure using the mounting assemblies. Gas spring and damper assemblies that include such mounting assemblies as well as suspension systems that include one of more of such gas spring and damper assemblies are also included.

The subject matter of the present disclosure may find particular application and use in conjunction with components for wheeled vehicles, and will be shown and described herein with reference thereto. However, it is to be appreciated that the subject matter of the present disclosure is also amenable to use in other applications and environments, and that the specific uses shown and described herein are merely exemplary. For example, the subject matter of the present disclosure could be used in connection with gas spring and damper assemblies of non-wheeled vehicles, support structures, height adjusting systems and actuators associated with industrial machinery, components thereof and/or other such equipment. Accordingly, the subject matter of the present disclosure is not intended to be limited to use associated with suspension systems of wheeled vehicles.

Wheeled motor vehicles of most types and kinds include a sprung mass, such as a body or chassis, for example, and an unsprung mass, such as two or more axles or other wheel-engaging members, for example, with a suspension system disposed therebetween. Typically, a suspension system will include a plurality of spring elements as well as a plurality of damping devices that together permit the sprung and unsprung masses of the vehicle to move in a somewhat controlled manner relative to one another. Generally, the plurality of spring elements function to accommodate forces and loads associated with the operation and use of the vehicle, and the plurality of damping devices are operative to dissipate undesired inputs and movements of the vehicle, particularly during dynamic operation thereof. Movement of the sprung and unsprung masses toward one another is normally referred to in the art as jounce motion while movement of the sprung and unsprung masses away from one another is commonly referred to in the art as rebound motion.

Suspension systems of a wide variety of types and kinds are generally known that permit relative movement between the sprung and unsprung masses of a vehicle. It has been recognized that, in some cases, such relative movement may impart relative rotation to components connected between the sprung and unsprung masses of the vehicle. For example, such conditions can occur in gas spring and damper assemblies in which a pressurized gas spring is assembled outwardly along an otherwise conventional damper. Such relative rotation is generally deemed undesirable as the same can induce a twist in the flexible wall of the gas spring assembly, which may lead to performance degradation and/or other issues.

Notwithstanding the overall success of known constructions, the foregoing and/or other disadvantages may still exist that could be limiting to broader adoption and/or use of gas spring and damper assemblies in connection with vehicle and/or other applications. Accordingly, it is believed desirable to develop constructions that may aid in overcoming the foregoing and/or other problems and/or disadvantages of known designs, and/or otherwise advance the art of vehicle suspension systems and/or components thereof.

BRIEF DESCRIPTION

One example of a mounting assembly in accordance with the subject matter of the present disclosure can be dimensioned for securement between an associated vehicle structure and an associated gas spring and damper assembly. The mounting assembly can include a first end plate dimensioned for securement to the associated vehicle structure. A second end plate can be attached in substantially fixed relation to the first end plate such that a mounting cavity is disposed therebetween. A connector housing having a longitudinal axis can be at least partially disposed within the mounting cavity. The connector housing can be dimensioned for operative connection to an associated gas spring and damper assembly. A first bearing assembly can be operatively disposed between the connector housing and the first end plate and can permit rotation of the connector housing relative to the first end plate while transferring forces acting longitudinally therebetween. A second bearing assembly can be operatively disposed between the connector housing and the second end plate and can permit rotation of the connector housing relative to the second end plate while transferring forces acting longitudinally therebetween.

One example of a gas spring and damper assembly in accordance with the subject matter of the present disclosure can include a mounting assembly according to the foregoing paragraph as well as a damper assembly and a gas spring assembly. The damper assembly can have a longitudinal axis and can include a damper housing and a damper rod assembly. The damper housing can at least partially define a damping chamber containing a quantity of damping fluid. The damper rod assembly can be operatively engaged with the damper housing for reciprocal displacement relative thereto and can be operatively connected to the connector housing of the mounting assembly. The gas spring assembly can be disposed in axially coextensive relation with at least a portion of the damper assembly. The gas spring assembly can include a flexible spring member extending peripherally about the longitudinal axis and longitudinally between opposing first and second ends such that a spring chamber is at least partially defined therebetween. A first end member can be supported on the damper housing and can be operatively secured across the first end of the flexible spring member such that a substantially fluid-tight connection is formed therebetween. The second end member can be operatively supported on the connector housing of the mounting assembly. The second end member can extend across the second end of the flexible spring member such that a substantially fluid-tight connection is formed therebetween.

In some cases, a gas spring and damper assembly according to the foregoing paragraph can further include an elastomeric bushing operatively connected between the damper rod assembly and the connector housing.

In some cases, a gas spring and damper assembly according to the foregoing paragraph further include a seal fluidically disposed along the connector housing along an opposing side of the elastomeric bushing from the spring chamber.

In some cases, a gas spring and damper assembly according to the foregoing paragraph can further include a sealing cap disposed along the connector housing in operative engagement with the seal.

One example of a suspension system in accordance with the subject matter of the present disclosure can include a pressurized gas system that includes a pressurized gas source and a control device. The suspension system can also include at least one gas spring and damper assembly according to any one of the foregoing four paragraphs. The at least one gas spring and damper assembly can be disposed in fluid communication with the pressurized gas source through the control device such that pressurized gas can be selectively transferred into and out of the spring chamber.

DETAILED DESCRIPTION

Turning now to the drawings, it is to be understood that the showings are for purposes of illustrating examples of the subject matter of the present disclosure and that the same are not intended to be limiting. Additionally, it will be appreciated that the drawings are not to scale and that portions of certain features and/or elements may be exaggerated for purpose of clarity and/or ease of understanding.

Figure 1:
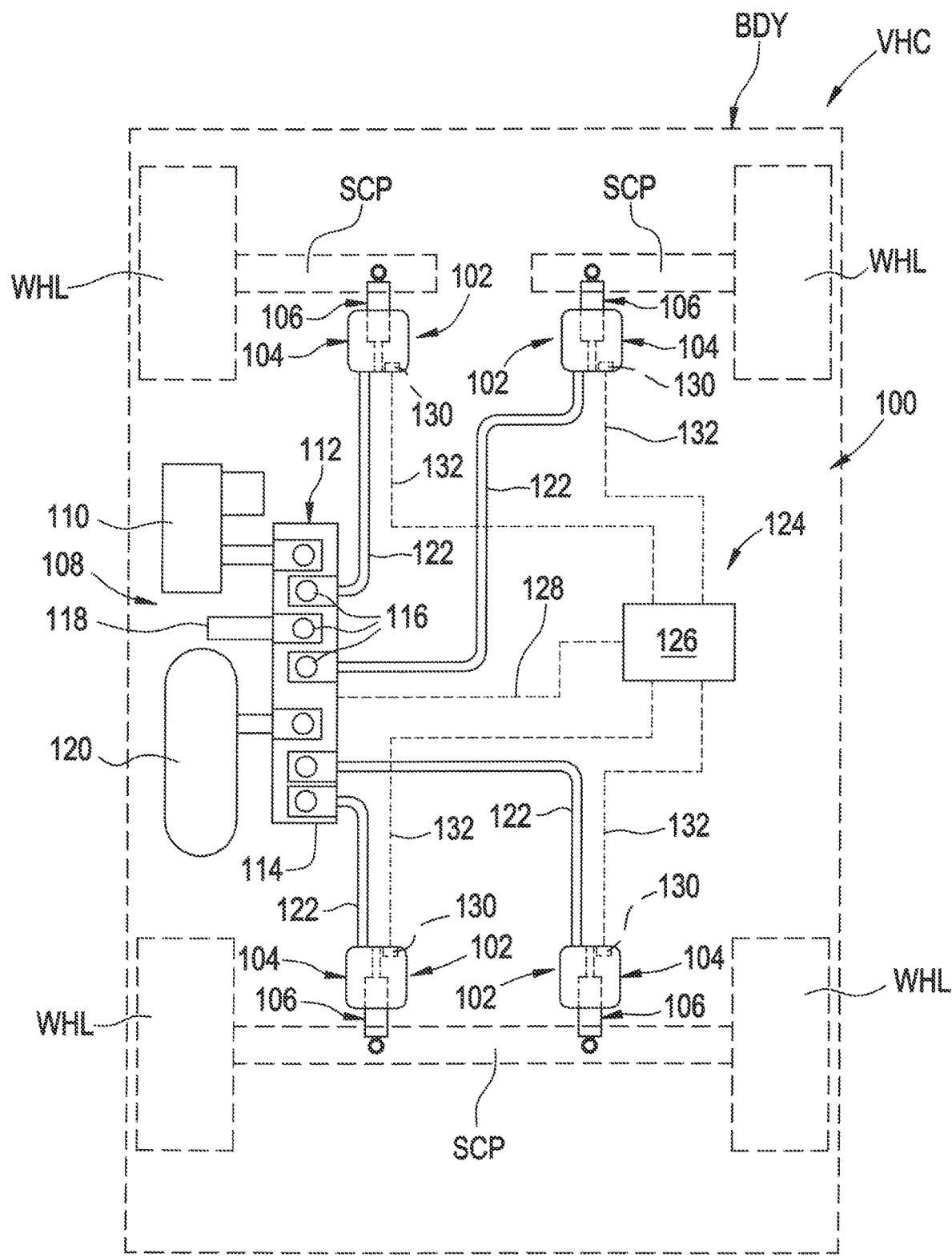
FIG. 1 is a schematic representation of one example of a suspension system of an associated vehicle that includes one or more gas spring and damper assemblies in accordance with the subject matter of the present disclosure.
Figure 2:
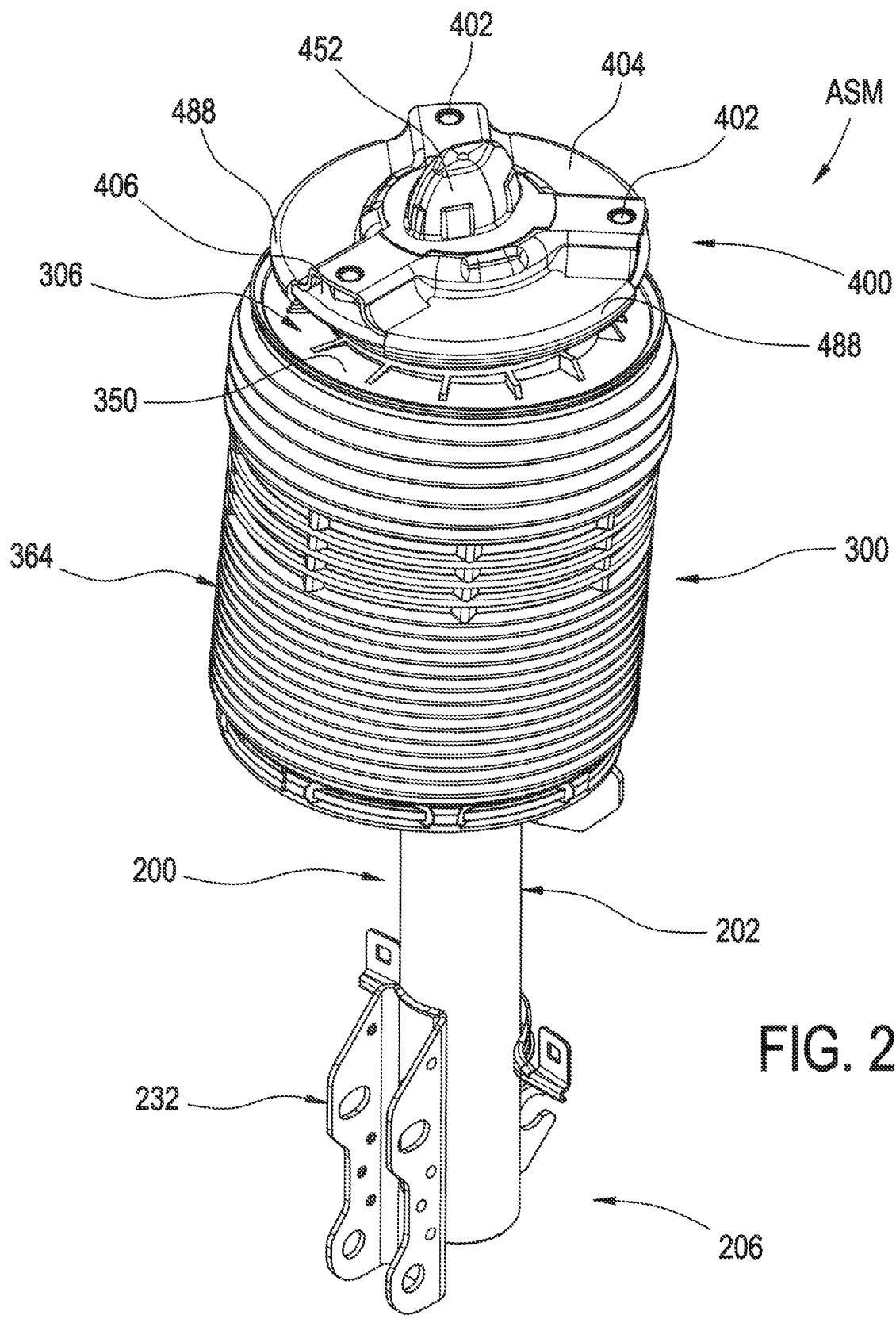
FIG. 2 is a top perspective view of one example of a gas spring and damper assembly in accordance with the subject matter of the present disclosure.
Figure 3:
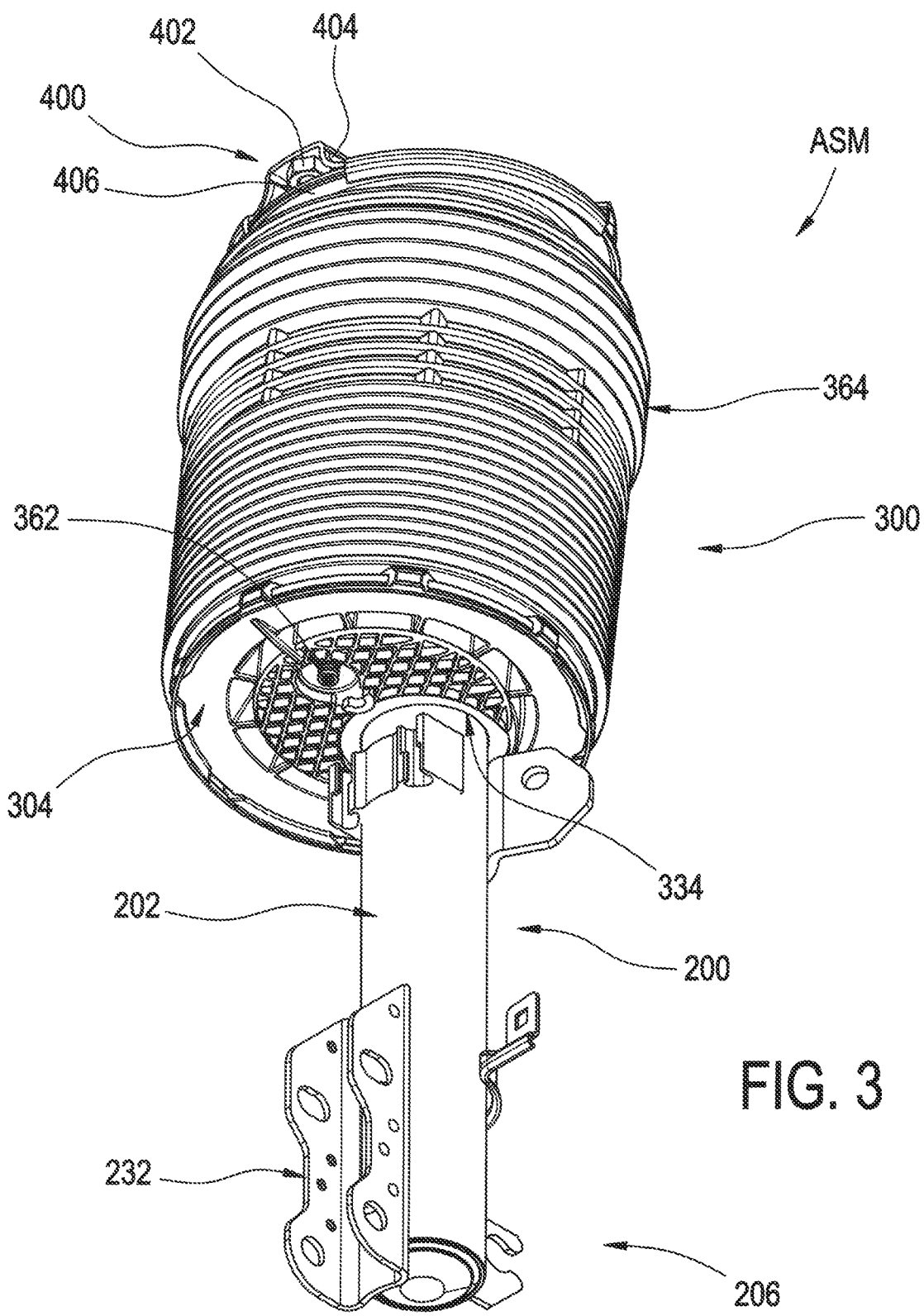
FIG. 3 is a bottom perspective view of the exemplary gas spring and damper assembly in FIG. 2.

FIG. 1 illustrates one example of a suspension system 100 operatively disposed between a sprung mass, such as an associated vehicle body BDY, for example, and an unsprung mass, such as an associated wheel WHL or an associated suspension component SCP, for example, of an associated vehicle VHC. It will be appreciated that any one or more of the components of the suspension system can be operatively connected between the sprung and unsprung masses of the associated vehicle in any suitable manner.

For example, in the arrangement shown, suspension system 100 can include a plurality of gas spring and damper assemblies 102 that are operatively connected between the sprung and unsprung masses of the vehicle. Depending on desired performance characteristics and/or other factors, the suspension system can include any suitable number of gas spring and damper assemblies. For example, in the arrangement shown in FIG. 1, suspension system 100 includes four gas spring and damper assemblies 102, one of which is disposed toward each corner of the associated vehicle adjacent a corresponding wheel WHL. It will be appreciated, however, that any other suitable number of gas spring and damper assemblies could alternately be used in any other configuration and/or arrangement. As shown in FIG. 1, gas spring and damper assemblies 102 are supported between suspension components SCP and body BDY of associated vehicle VHC, and include a gas spring (or gas spring assembly) 104 and a damper (or damper assembly) 106. It will be recognized that gas springs 104 are shown and described herein as being of a rolling lobe-type construction. It is to be understood, however, that gas spring assemblies of other types, kinds and/or constructions could alternately be used without departing from the subject matter of the present disclosure.

Suspension system 100 also includes a pressurized gas system 108 operatively associated with the gas spring and damper assemblies for selectively supplying pressurized gas (e.g., air) thereto and selectively transferring pressurized gas therefrom. In the exemplary embodiment shown in FIG. 1, pressurized gas system 108 includes a pressurized gas source, such as a compressor 110, for example, for generating pressurized air or other gases. A control device, such as a valve assembly 112, for example, is shown as being in communication with compressor 110 and can be of any suitable configuration or arrangement. In the exemplary embodiment shown, valve assembly 112 includes a valve block 114 with a plurality of valves 116 supported thereon. Valve assembly 112 can also, optionally, include a suitable exhaust, such as a muffler 118, for example, for venting pressurized gas from the system. Optionally, pressurized gas system 108 can also include a reservoir 120 in fluid communication with the compressor and/or valve assembly 112 that is suitable for storing pressurized gas.

Valve assembly 112 is in communication with gas springs 104 and/or dampers 106 of assemblies 102 through suitable gas transfer lines 122. As such, pressurized gas can be selectively transferred into and/or out of the gas springs and/or the dampers through valve assembly 112 by selectively operating valves 116, such as to alter or maintain vehicle height at one or more corners of the vehicle, for example.

Suspension system 100 can also include a control system 124 that is capable of communication with any one or more systems and/or components (not shown) of vehicle VHC and/or suspension system 100, such as for selective operation and/or control thereof. Control system 124 can include a controller or electronic control unit (ECU) 126 communicatively coupled with compressor 110 and/or valve assembly 112, such as through a conductor or lead 128, for example, for selective operation and control thereof, which can include supplying and exhausting pressurized gas to and/or from gas spring and damper assemblies 102. Controller 126 can be of any suitable type, kind and/or configuration.

Control system 124 can also, optionally, include one or more sensing devices 130, such as, for example, may be operatively associated with the gas spring and damper assemblies and capable of outputting or otherwise generating data, signals and/or other communications having a relation to one or more of: a height of the gas spring and damper assemblies; a distance between other components of the vehicle, a pressure or temperature having a relation to the gas spring and damper assembly and/or a wheel or tire or other component associated with the gas spring and damper assembly; and/or an acceleration, load or other input acting on the gas spring and damper assembly. Sensing devices 130 can be in communication with ECU 126, which can receive the data, signals and/or other communications therefrom. The sensing devices can be in communication with ECU 126 in any suitable manner, such as through conductors or leads 132, for example. Additionally, it will be appreciated that the sensing devices can be of any suitable type, kind and/or construction and can operate using any suitable combination of one or more operating principles and/or techniques.

Figure 6:
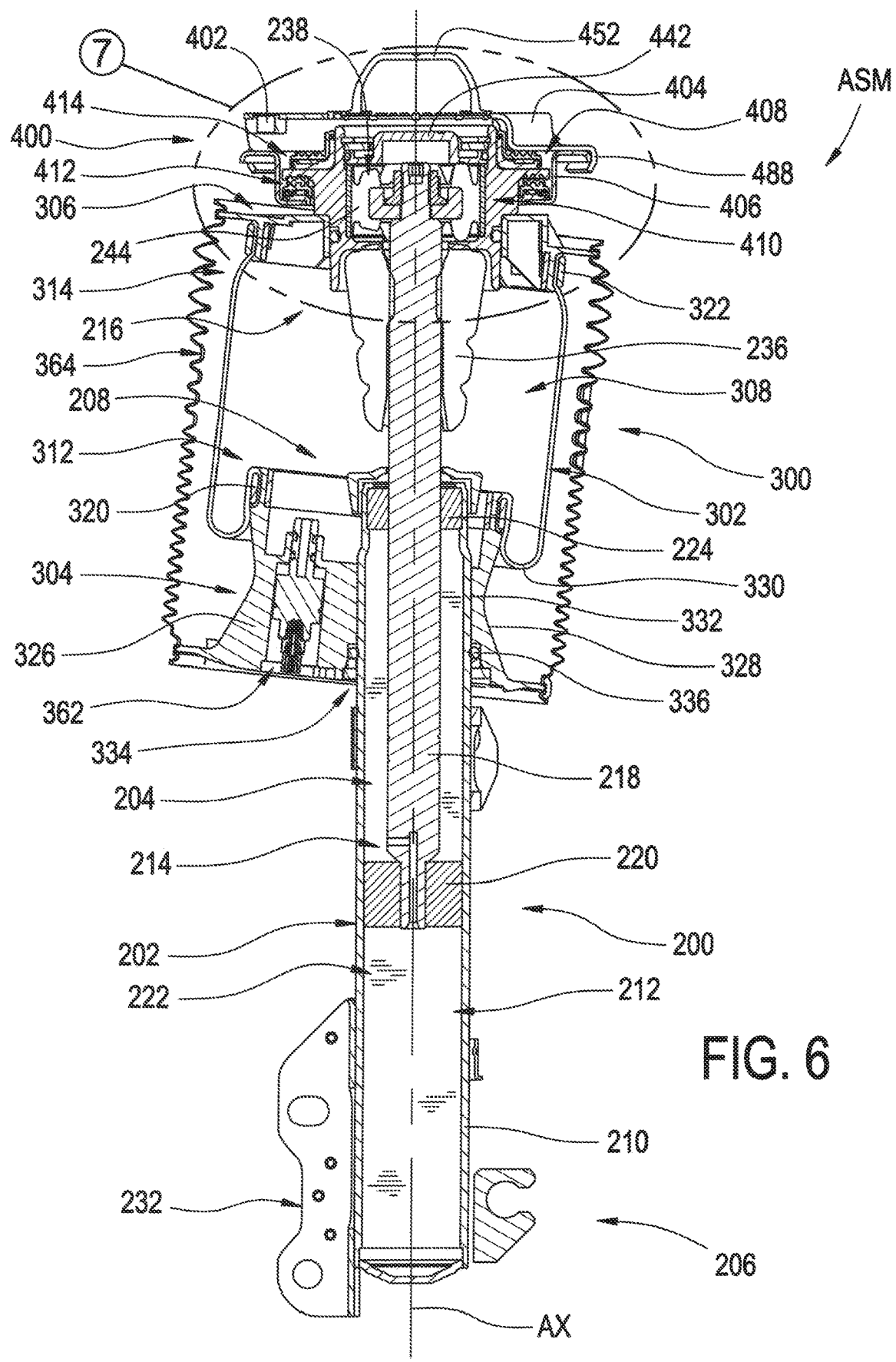
FIG. 6 is a cross-sectional side view of the exemplary gas spring and damper assembly in FIGS. 2-5 taken from along line 6-6 in FIG. 5.

Having described an example of a suspension system (e.g., suspension system 100) that can include gas spring and damper assemblies in accordance with the subject matter of the present disclosure, one example of such a gas spring and damper assembly will now be described in connection with FIGS. 2-9. As shown therein, one example of a gas spring and damper assembly ASM, such as may be suitable for use as one or more of gas spring and damper assemblies 102 in FIG. 1, for example, includes a damper (or damper assembly) 200 such as may correspond to one of dampers 106 in FIG. 1, for example, and a gas spring (or gas spring assembly) 300, such as may correspond to one of gas springs 104 in FIG. 1, for example. A gas spring and damper assembly in accordance with the subject matter of the present disclosure (e.g., assembly ASM) can also include a mounting assembly 400 in accordance with the subject matter of the present disclosure. Gas spring assembly 200 and damper assembly 300 can be disposed in a coextensive arrangement with one another, and can be operatively secured to one another in any suitable manner, such as is described hereinafter, for example, in connection with mounting assembly 400. A longitudinal axis AX extends lengthwise along assembly ASM, as shown in FIG. 6.

Damper assembly 200 can include a damper housing 202 and a damper rod assembly 204 that is at least partially received in the damper housing. Damper housing 202 extends axially between housing ends 206 and 208, and includes a housing wall 210 that at least partially defines a damping chamber 212. Damper rod assembly 204 extends lengthwise between opposing ends 214 and 216 and includes an elongated damper rod 218 and a damper piston 220 disposed along end 216 of damper rod assembly 204. Damper piston 220 is received within damping chamber 212 of damper housing 202 for reciprocal movement along the housing wall in a conventional manner. A quantity of damping fluid 222 can be disposed within damping chamber 212, and damper piston 220 can be displaced through the damping fluid to dissipate kinetic energy acting on gas spring and damper assembly ASM. Though damper assembly 200 is shown and described herein as having a conventional construction in which a hydraulic fluid is contained within at least a portion of damping chamber 212, it will be recognized and appreciated that dampers of other types, kinds and/or constructions, such as pressurized gas or "air" dampers, for example, could be used without departing from the subject matter of the present disclosure.

That is, it will be appreciated that a gas spring and damper assembly in accordance with the subject matter of the present disclosure can, in some cases, include a damper of an otherwise conventional construction that utilizes hydraulic oil or other liquid as a working medium of the damper. In other cases, the damper can be of a type and kind that utilizes pressurized gas as a working medium. In such cases, such a gas damper can include one or more elongated gas damping passages through which pressurized gas can flow to generate pressurized gas damping to dissipate kinetic energy acting on the gas spring and damper assembly. It will be appreciated that such one or more elongated gas damping passages can be of any suitable size, shape, configuration and/or arrangement. Additionally, it will be appreciated that any number of one or more features and/or components can be used, either alone or in combination with one another, to form or otherwise establish such one or more elongated gas damping passages.

Housing wall 210 can form an opening (not numbered) along housing end 206. A damper end wall 224 can extend across the opening and can be secured on or along housing wall 210 such that a substantially fluid-tight connection is formed therebetween. Damper end wall 224 can include an opening (not numbered) and elongated damper rod 218 can extend axially outward from damping chamber 212 through the opening in a direction opposite housing end 208. Additionally, a damper end wall (not numbered) can be connected across end 208 of damper housing 202 such that a substantially fluid-tight connection is formed therebetween.

Elongated damper rod 218 can project outwardly from damper end wall 224 such that end 214 of the damper rod assembly is outwardly exposed from the damper housing and is externally accessible with respect to the damper housing. A securement device 226, such as one or more helical threads, for example, can be provided on or along the elongated rod for use in operatively connecting damper assembly 200 on or along mounting assembly 400, such as by way of a securement device 228 (e.g., a threaded nut).

Figure 4:
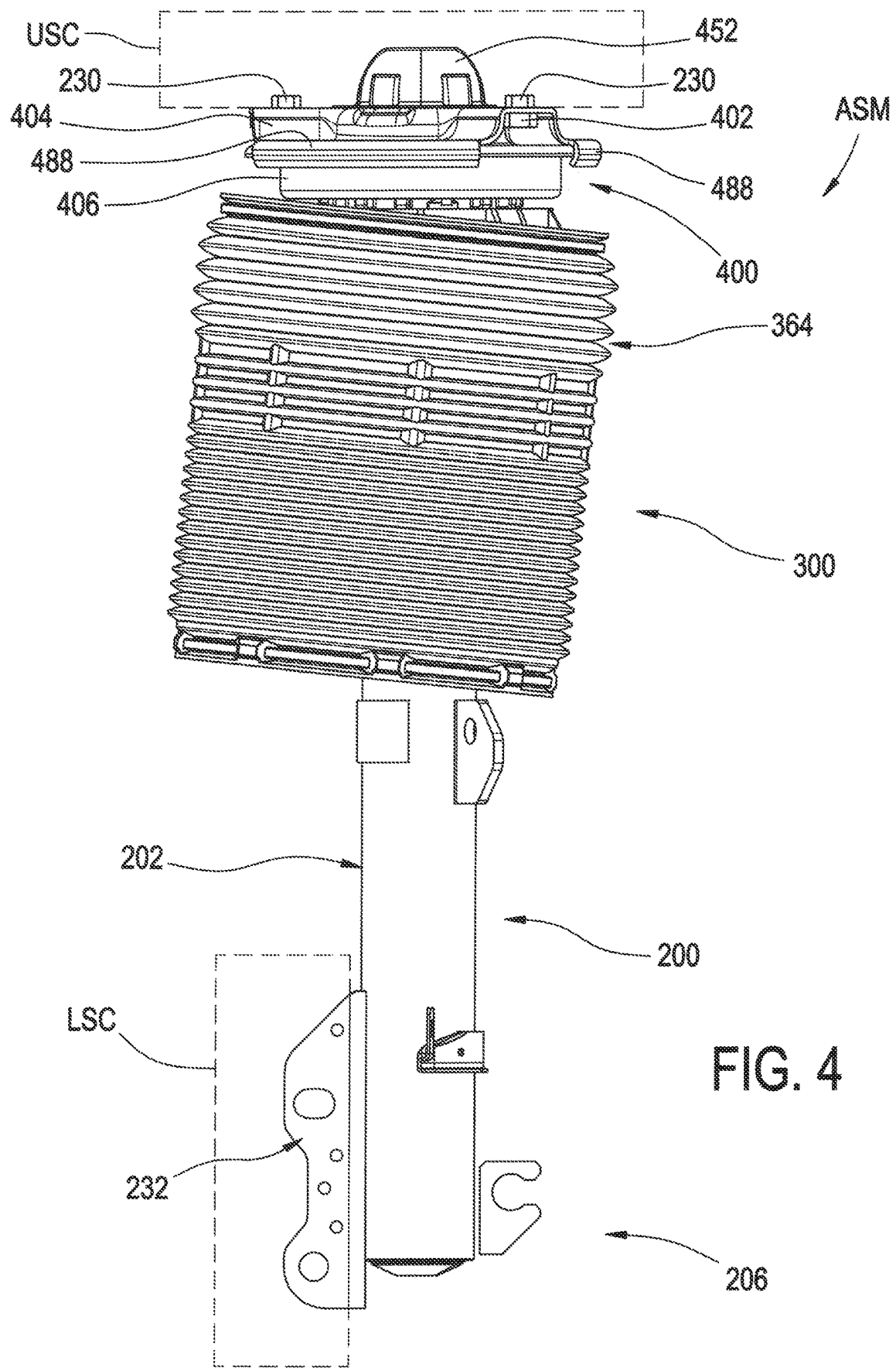
FIG. 4 is a side elevation view of the exemplary gas spring and damper assembly in FIGS. 2 and 3.
Figure 5:
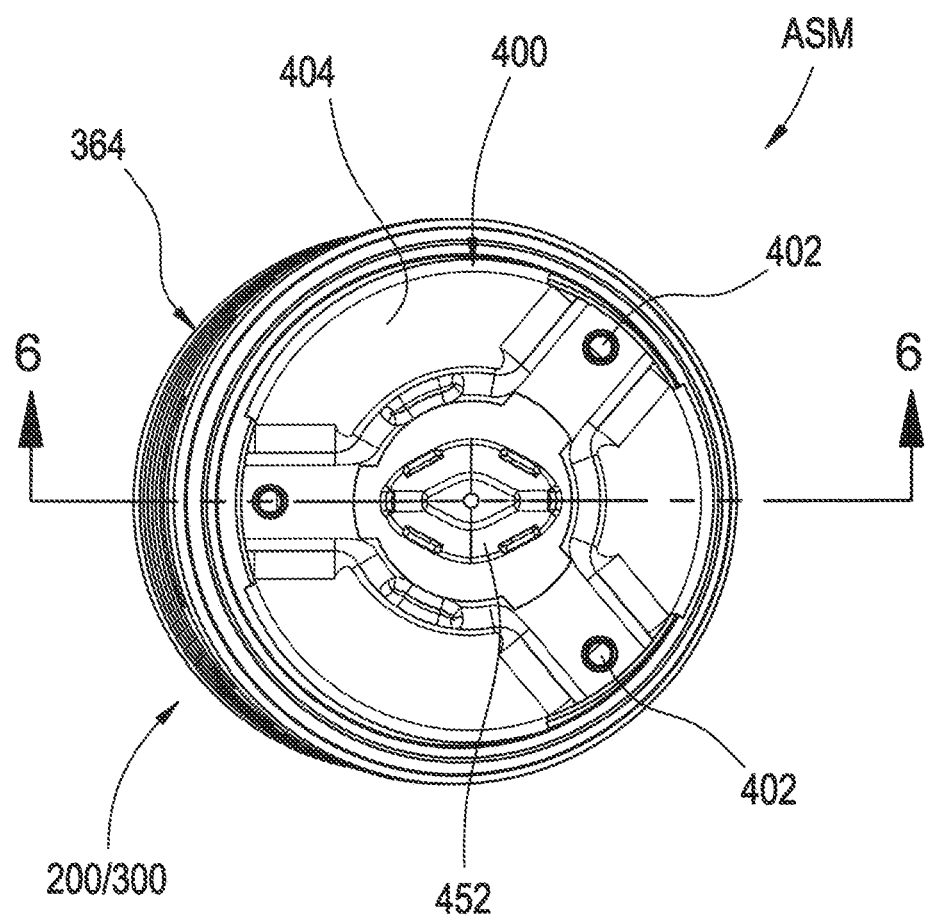
FIG. 5 is a top plan view of the exemplary gas spring and damper assembly in FIGS. 2-4.

It will be appreciated that gas spring and damper assembly ASM can be operatively connected between associated sprung and unsprung masses of an associated vehicle (or other construction) in any suitable manner. For example, one end of the assembly can be operatively connected to an associated sprung mass with the other end of the assembly disposed toward and operatively connected to an associated unsprung mass. As shown in FIGS. 4 and 6, for example, end 214 of damper rod assembly 204 can be operatively engaged with a first or upper structural component USC, such as associated vehicle body BDY in FIG. 1, for example, by way of mounting assembly 400. It will be appreciated that gas spring and damper assembly ASM can be secured on or along upper structural component USC in any suitable manner, such as by way of securement devices 230 operatively engaging corresponding securement devices 402 of mounting assembly 400, for example. Additionally, or in the alternative, damper assembly 200 can include a mounting bracket 232 disposed along end 208 of damper housing 202, which can be secured on or along a second or lower structural component LSC (FIG. 4), such as associated suspension component SCP in FIG. 1, for example, and can be secured thereon in any suitable manner.

Gas spring assembly 300 can include a flexible spring member 302 that can extend peripherally around axis AX and can be secured between opposing end members (or end member assemblies) 304 and 306 in a substantially fluid-tight manner such that a spring chamber 308 is at least partially defined therebetween. It will be appreciated that flexible spring member 302 can be of any suitable size, shape, construction and/or configuration. Additionally, the flexible spring member can be of any type and/or kind, such as a rolling lobe-type or convoluted bellows-type construction, for example. Flexible spring member 302 is shown in FIGS. 1 and 6 as including a flexible wall 310 that can be formed in any suitable manner and from any suitable material or combination of materials. For example, the flexible wall can include one or more fabric-reinforced, elastomeric plies or layers and/or one or more un-reinforced, elastomeric plies or layers. Typically, one or more fabric-reinforced, elastomeric plies and one or more un-reinforced, elastomeric plies will be used together and formed from a common elastomeric material, such as a synthetic rubber, a natural rubber or a thermoplastic elastomer. In other cases, however, a combination of two or more different materials, two or more compounds of similar materials, or two or more grades of the same material could be used.

Flexible wall 310 can extend in a generally longitudinal direction between opposing ends 312 and 314. Additionally, flexible wall 310 can include an outer surface 316 and an inner surface 318 with the inner surface at least partially defining spring chamber 308. Flexible wall 310 can include an outer or cover ply (not identified) that at least partially forms outer surface 316. Flexible wall 310 can also include an inner or liner ply (not identified) that at least partially forms inner surface 318. In some cases, flexible wall 310 can further include one or more reinforcing plies (not shown) disposed between outer and inner surfaces 316 and 318. The one or more reinforcing plies can be of any suitable construction and/or configuration. For example, the one or more reinforcing plies can include one or more lengths of filament material that are at least partially embedded therein. Additionally, it will be appreciated that the one or more lengths of filament material, if provided, can be oriented in any suitable manner. As one example, the flexible wall can include at least one layer or ply with lengths of filament material oriented at one bias angle and at least one layer or ply with lengths of filament material oriented at an equal but opposite bias angle.

Figure 7:
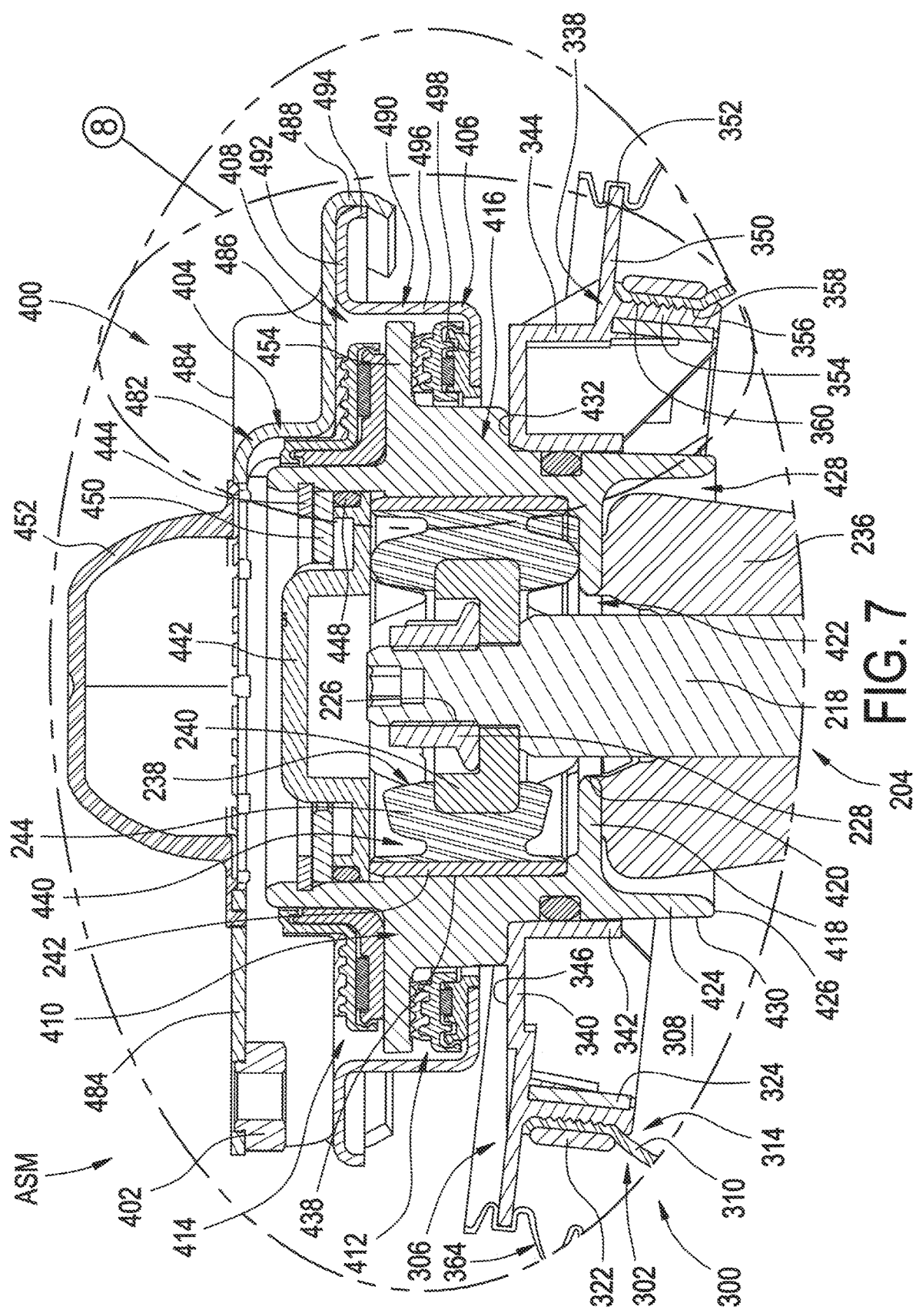
FIG. 7 is an enlarged view of the portion of the exemplary gas spring and damper assembly in FIGS. 2-6 identified as Detail 7 in FIG. 6.
Figure 8:
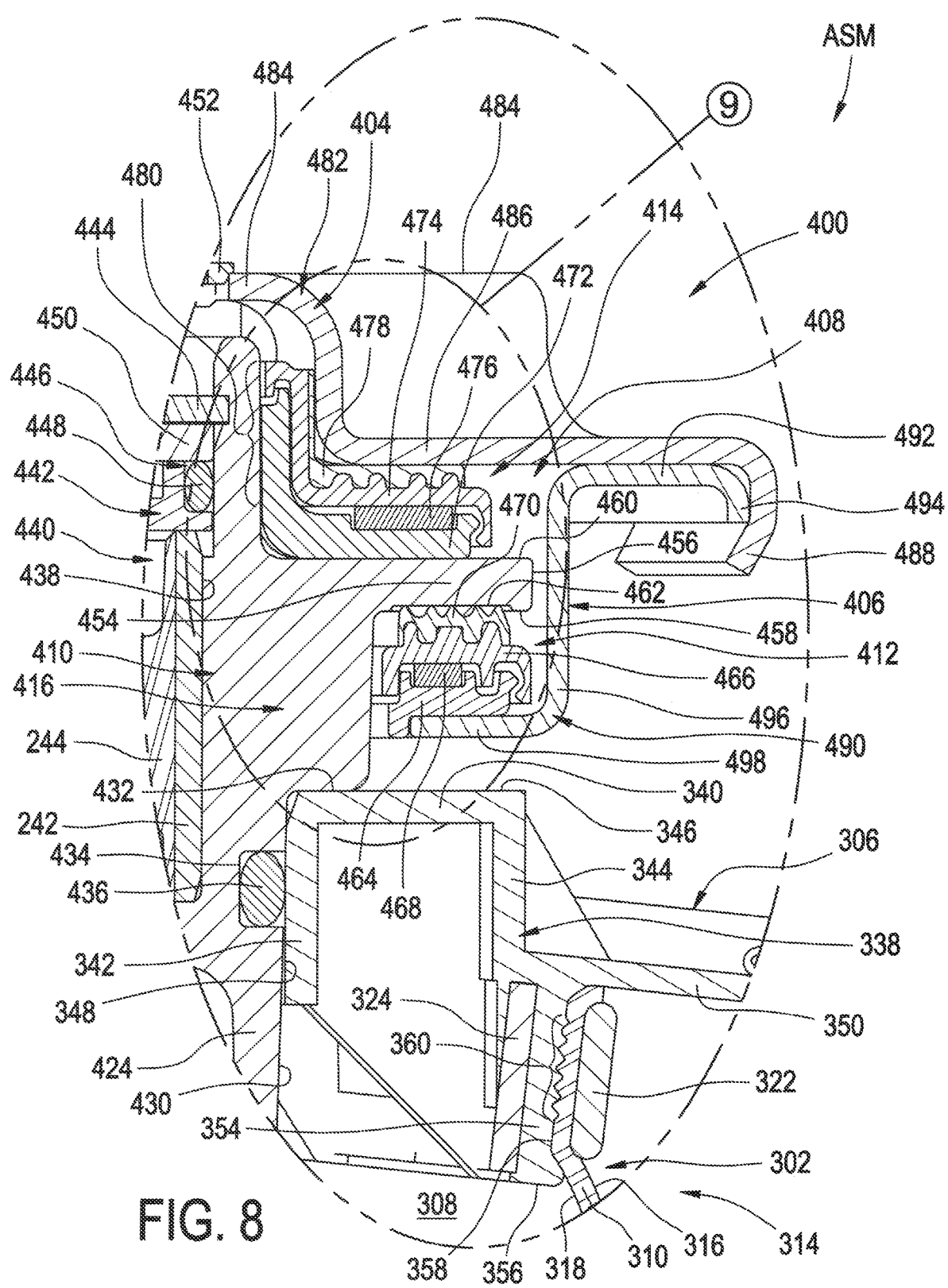
FIG. 8 is an enlarged view of the portion of the exemplary gas spring and damper assembly in FIGS. 2-7 identified as Detail 8 in FIG. 7.

Flexible spring member 302 can include any feature or combination of features suitable for forming a substantially fluid-tight connection with end member 304 and/or 306. As one example, flexible spring member 302 can include open ends that are secured on or along the corresponding end members by way of one or more crimp rings 320 and 322. Alternately, a mounting bead (not shown) could be disposed along either or both of the ends of the flexible wall. In some cases, the mounting bead, if provided, could, optionally, include a reinforcing element, such as an endless, annular bead wire, for example. In some cases, one or more backing rings 324 can be included on or along end members 304 and/or 306 to provide additional support on or along the crimp connection between the flexible spring member and the end member, such as is shown in FIGS. 6-8, for example.

End member 304 can include an end member wall 326 that can include any suitable number of one or more walls, wall portions, surfaces and/or surface portions. For example, end member wall 326 can at least partially define an outer surface portion 328 on or along which a rolling lobe 330 of flexible spring member can be formed and displaced as assembly ASM extends and compresses during use. End member wall 326 can also at least partially define an inner surface portion 332 that at least partially defines a passage 334 through end member 304. Passage 334 can be dimensioned for receipt on or along damper housing 202 and can be supported thereon in any suitable manner. As one non-limiting example, damper 200 can include a support ring 234 disposed along housing wall 210. Damper housing 202 can extend through passage 334 such that end member 304 engages support ring 234 to operatively support the end member on the damper housing. In some cases, a seal 336 can be disposed in fluid communication between damper housing 202 and end member 304, such as to fluidically isolate spring chamber 212 from an external atmosphere ATM, for example. It will be appreciated, however, that other configurations and/or arrangements could alternately be used.

Additionally, end member 306 can include an end member wall 338 with any suitable number of one or more walls, wall portions, surfaces and/or surface portions. For example, end member wall 338 can include an end wall portion 340 that is oriented transverse to axis AX and extends radially between a side wall portion 342 disposed radially inward of the end wall portion and a side wall portion 344 disposed radially outward of end wall portion 340. End wall portion 340 can include a surface portion 346 that faces away from end member 304, and side wall portion 342 can include a surface portion 348 that faces radially inward to at least partially define a passage (not numbered) through end member 306. End member wall 338 can also include a flange wall portion 350 that extends radially outward from along side wall portion 344 toward an outer peripheral edge 352. A crimp wall portion 354 can extend axially from along flange wall portion 350 toward a distal edge 356. Crimp wall portion 354 can include an outer surface portion 358 that can, optionally, include one or more securement features 360, such as annular grooves, for example, disposed therealong, such as may be suitable for operatively engaging end 314 of flexible wall 310, for example. In such cases, crimp ring 322 can secure the end of the flexible wall in abutting engagement with securement features 360 and backing ring 324 can, optionally, provide additional support to the crimped connection.

It will be appreciated that gas spring and damper assembly ASM is displaceable, during use in normal operation, between extended and compressed conditions. In some cases, one or more jounce bumpers can be included to inhibit contact between one or more features and/or components of assembly ASM. For example, a jounce bumper 236 on or along elongated damper rod 218 within spring chamber 308 adjacent end member 306 to substantially inhibit contact between a component of damper assembly 200 and end member assembly 306 during a full jounce condition of assembly ASM. It will be appreciated, however, that other configurations and/or arrangements could alternately be used. And, it will be appreciated that assembly ASM can, optionally, include any suitable number of zero or more additional components and/or features. As one non-limiting example, one or more sensors and/or control devices can be included on or otherwise operatively associated with assembly ASM. It will be appreciated that all combinations of such components and/or devices are collectively represented in FIG. 6 by device 362, which is shown extending through end member wall 326 and into fluid communication with spring chamber 308. As another non-limiting example, a protective bellows 364 can extend at least partially around and/or co-extensively along damper assembly 200 and/or gas spring assembly 300, such as by being operatively connected to end members 304 and 306, for example.

One non-limiting example of a mounting assembly in accordance with the subject matter of the present disclosure is shown in detail in FIGS. 2 and 4-9 as mounting assembly 400, which operatively connects damper assembly 200 and gas spring assembly 300 with upper structural component USC. In the arrangement shown and described herein, mounting assembly 400 is included as a part of gas spring and damper assembly ASM. It will be appreciated, however, that the construction shown and described herein is merely exemplary and not intended to be limiting. Mounting assembly 400 can include end plates 404 and 406 that are secured together to at least partially define a mounting chamber 408. A connector housing 410 is at least partially disposed within mounting chamber 408 and is supported therein between a bearing assemblies 412 and 414. In this manner, connector housing 410 is supported axially by bearing assemblies 412 and 414 while remaining rotatable about longitudinal axis AX. As shown in FIGS. 6-9, damper rod assembly 204 and end member 306 can be operatively connected to connector housing 410 such that the any relative rotation of the damper rod assembly and/or the end member about longitudinal axis AX can be accommodated through rotation of connector housing 410 while axial loads, such as may be due to jounce and/or rebound conditions, are transferred through to the associated vehicle structure.

Connector housing 410 is shown as including a housing wall 416 that can include any suitable number of one or more walls, wall portions, surface and/or surface portions. For example, housing wall 416 includes an end wall portion 418 that is oriented transverse to longitudinal axis AX and extend radially inward to an inner peripheral edge 420 that at least partially defines a passage 422 through connector housing 410 and through which at least a portion of elongated damper rod 218 extends. Housing wall 416 can also include a wall portion 424 that extends axially from adjacent end wall portion 418 toward a distal edge 426. In some cases, end wall portion 418 and/or wall portion 424 can at least partially define a recess 428 dimensioned to receive at least a portion of jounce bumper 236. Wall portion 424 can include a surface portion 430 facing radially outward and along which at least a portion of end member wall 338 can be disposed. In the arrangement shown, surface portion 348 of side wall portion 342 and surface portion 430 of wall portion 424 are disposed in facing relation with one another and, in some cases, can be disposed in abutting engagement. Housing wall 416 can also include a shoulder surface portion 432 that is oriented transverse to axis AX and extends radially outward in axially-spaced relation to distal edge 426. In the arrangement shown, surface portion 346 of end wall portion 340 can be disposed in abutting engagement with shoulder surface portion 432. In some cases, housing wall 416 can include an annular groove 434 that extends radially inward from along surface portion 430 and is dimensioned to at least partially receive a seal 436. If provided, seal 436 can sealingly engage connector housing 410 and end member 306 to substantially fluidically-isolate spring chamber 308 from external atmosphere ATM. Additionally, in such an arrangement, compressive forces acting on gas spring assembly 300 can be transferred through end member 306 into connector housing 410 and into end plate 404 through bearing assembly 414.

Housing wall 416 of connector housing 410 includes an inner side surface portion 438 that at least partially defines a recess 440 dimensioned to receive a damper bushing 238, which can include a inner metal 240, an outer metal 242 and an elastomeric body 244 connected between the inner and outer metals. Elongated damper rod 218 extends through damper bushing 238 and is secured along inner metal 240 in a suitable manner, such as by way of securement devices 226 and 228, for example. Damper bushing 238 can be retained within recess 440 in any suitable manner. As one non-limiting example, mounting assembly 400 can include a seal cap 442 that can be at least partially received within recess 440. Seal cap 442 can abuttingly engage outer metal 242. A securement device 444, such as a retaining ring, for example, can be disposed along inner side surface portion 438 to at least partially retain seal cap 442 within the recess and thereby maintain damper bushing 238 in position. In some cases, seal cap 442 can at least partially define an annular groove 446 dimensioned to at least partially receive a seal 448. In some cases, a washer 450 or other component can be supported between seal cap 442 and securement device 444 across annular groove 446. If provided, seal 448 can sealingly engage connector housing 410 and seal cap 442 to substantially fluidically-isolate spring chamber 308 from external atmosphere ATM. Additionally, in such an arrangement, compressive forces acting on damper assembly 200 can be transferred through damper bushing 238 into connector housing 410 and into end plate 404 through bearing assembly 414. Furthermore, in such an arrangement, tension forces acting on damper assembly 200 can be transferred through damper bushing 238 into connector housing 410 and into end plate 406 through bearing assembly 412. Such forces and/or loads are then transferred from end plate 406 into upper structural component USC through end plate 404. In some cases, an alignment cap 452 or other covering device can, optionally, be operatively secured along or across recess 440 and/or seal cap 442.

Figure 9:
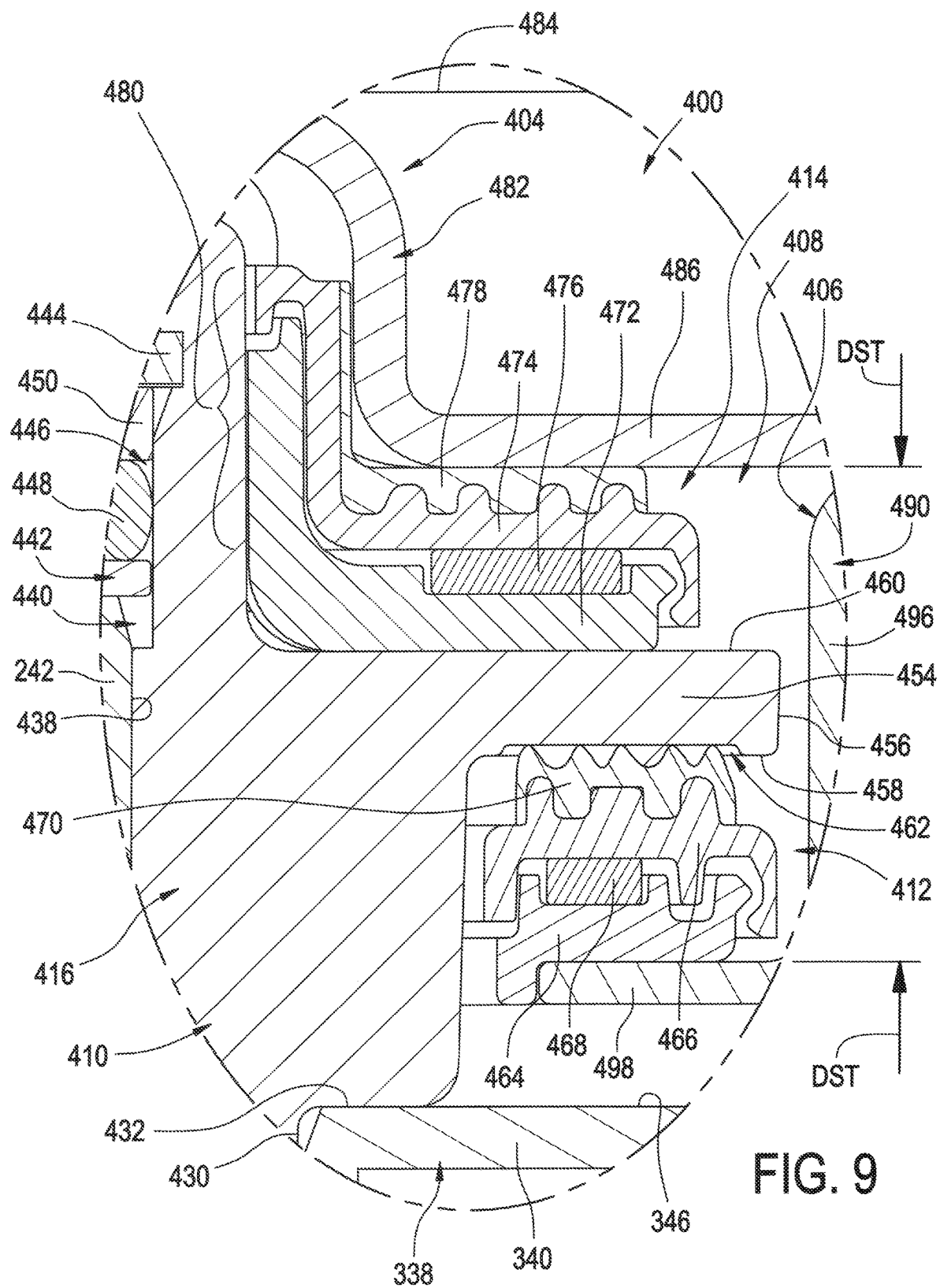
FIG. 9 is an enlarged view of the portion of the exemplary gas spring and damper assembly in FIGS. 2-8 identified as Detail 9 in FIG. 8.

As identified in FIGS. 8 and 9, housing wall 416 of connector housing 410 can also include a flange wall portion 454 that extends radially outward beyond shoulder surface portion 432 to an outer peripheral edge 456 of the connector housing. Flange wall portion 454 can include a surface portion 458 facing toward bearing assembly 412 and a surface portion 460 facing toward bearing assembly 414. In some cases, flange wall portion 454 can include an annular groove or recess 462 extending axially into the housing wall from along surface portion 458. Bearing assemblies 412 can include a case element 464, a case element 466 and a slide element 468 disposed between case elements 464 and 466. In the arrangement shown, case element 464 is disposed along end plate 406 and case element 466 is disposed toward flange wall portion 454. Bearing assembly 412 can also include an elastomeric body 470 disposed between case element 464 and end plate 406 and/or case element 466 and connector housing 410, such as is shown in FIGS. 7-9, for example. Bearing assemblies 414 can include a case element 472, a case element 474 and a slide element 476 disposed between case elements 472 and 474. In the arrangement shown, case element 472 is disposed toward end plate 404 and case element 474 is disposed toward flange wall portion 454. Bearing assembly 414 can also include an elastomeric body 478 disposed between case element 472 and end plate 404 and/or case element 474 and connector housing 410, such as is shown in FIGS. 7-9, for example. If provided, either or both of elastomeric bodies 470 and 478 can be configured to isolate a predetermined range of frequencies of vibration, such as may be identified or otherwise associated with noise, vibration and/or harshness, for example. While the case and slide elements can be at least partially formed from substantially rigid materials, elastomeric bodies 470 and/or 478 can be at least partially formed from any combination of one or more compliant materials. As non-limiting examples, the elastomeric bodies can include any combination of one or more of natural rubber, synthetic rubber (e.g., EPDM, polychloroprene), and/or thermoplastic elastomers (e.g., thermoplastic polyurethane, thermoplastic vulcanizate, thermoplastic polyolefin).

In some cases, the case and/or slide elements of either or both of bearing assemblies 412 and 414 can be approximately planar, and can accommodate forces and loads acting in at least an axial direction. Additionally, or in the alternative, the case and/or slide elements of either or both of bearing assemblies 412 and 414 can have both planar and radial extends, such as may respectively accommodate forces and/or loads acting in axial directions and lateral directions (e.g., transverse to axis AX). As non-limiting examples, bearing assembly 412 is shown as being approximately planar whereas bearing assembly 414 includes both a planar portion as well as a radial portion, as is represented in FIG. 9 by reference number 480.

End plate 404 includes an end plate wall 482 with one or more mounting wall portions 484 oriented transverse to longitudinal axis AX as well as one or more support wall portions 486 offset from mounting wall portions 484 in a direction toward end plate 406. The one or more support wall portions extend radially outward to one or more peripheral edge wall portions 488. End plate 406 includes an end plate wall 490 with an outer peripheral wall portion 492 that extends radially inward from an outer peripheral edge wall portion 494 to a side wall portion 496. An end wall portion 498 is axially offset from outer peripheral wall portion 492 such that a predetermined height or distance is included between support wall portions 486 of end plate 404 and end wall portion 498 of end plate 406, as is represented in FIG. 9 by reference dimension DST.

It will be appreciated that end plates 404 and 406 can be secured to one another in any suitable manner. As one non-limiting example, one or more securement devices could be used, such as threaded fasteners and/or rivets, for example. As another non-limiting example, one or more flowed-material joints could be used. As a further non-limiting example, one or more of peripheral edge wall portions 492 of end plate wall 482 could be crimped, formed or otherwise displaced along or around one or more portions of outer peripheral edge 494 of end plate wall 490, such as is shown in FIGS. 2-8, for example. And, it may be desirable to assemble end plates 404 and 406 together such that distance DST falls within a predetermined height range such that a desired preload force (e.g., compression) can be applied to bearing assemblies 412 and 414. It will be appreciated that the desired preload force or preload force range may vary from application-to-application.

As used herein with reference to certain features, elements, components and/or structures, numerical ordinals (e.g., first, second, third, fourth, etc.) may be used to denote different singles of a plurality or otherwise identify certain features, elements, components and/or structures, and do not imply any order or sequence unless specifically defined by the claim language. Additionally, the terms "transverse," and the like, are to be broadly interpreted. As such, the terms "transverse," and the like, can include a wide range of relative angular orientations that include, but are not limited to, an approximately perpendicular angular orientation. Also, the terms "circumferential," "circumferentially," and the like, are to be broadly interpreted and can include, but are not limited to circular shapes and/or configurations. In this regard, the terms "circumferential," "circumferentially," and the like, can be synonymous with terms such as "peripheral," "peripherally," and the like.

Furthermore, the phrase "flowed-material joint" and the like, if used herein, are to be interpreted to include any joint or connection in which a liquid or otherwise flowable material (e.g., a melted metal or combination of melted metals) is deposited or otherwise presented between adjacent component parts and operative to form a fixed and substantially fluid-tight connection therebetween. Examples of processes that can be used to form such a flowed-material joint include, without limitation, welding processes, brazing processes and soldering processes. In such cases, one or more metal materials and/or alloys can be used to form such a flowed-material joint, in addition to any material from the component parts themselves. Another example of a process that can be used to form a flowed-material joint includes applying, depositing or otherwise presenting an adhesive between adjacent component parts that is operative to form a fixed and substantially fluid-tight connection therebetween. In such case, it will be appreciated that any suitable adhesive material or combination of materials can be used, such as one-part and/or two-part epoxies, for example.

Further still, the term "gas" is used herein to broadly refer to any gaseous or vaporous fluid. Most commonly, air is used as the working medium of gas spring devices, such as those described herein, as well as suspension systems and other components thereof. However, it will be understood that any suitable gaseous fluid could alternately be used.

It will be recognized that numerous different features and/or components are presented in the embodiments shown and described herein, and that no one embodiment may be specifically shown and described as including all such features and components. As such, it is to be understood that the subject matter of the present disclosure is intended to encompass any and all combinations of the different features and components that are shown and described herein, and, without limitation, that any suitable arrangement of features and components, in any combination, can be used. Thus, it is to be distinctly understood claims directed to any such combination of features and/or components, whether or not specifically embodied herein, are intended to find support in the present disclosure. To aid the Patent Office and any readers of this application and any resulting patent in interpreting the claims appended hereto, Applicant does not intend any of the appended claims or any claim elements to invoke 35 U.S.C. 112(f) unless the words "means for" or "step for" are explicitly used in the particular claim.

While the subject matter of the present disclosure has been described with reference to the foregoing embodiments and considerable emphasis has been placed herein on the structures and structural interrelationships between the component parts of the embodiments disclosed, it will be appreciated that other embodiments can be made and that many changes can be made in the embodiments illustrated and described without departing from the principles hereof. Obviously, modifications and alterations will occur to others upon reading and understanding the preceding detailed description. Accordingly, it is to be distinctly understood that the foregoing descriptive matter is to be interpreted merely as illustrative of the subject matter of the present disclosure and not as a limitation. As such, it is intended that the subject matter of the present disclosure be construed as including all such modifications and alterations.

The invention claimed is:

1. A mounting assembly dimensioned for securement between an associated vehicle structure and an associated gas spring and damper assembly, said mounting assembly comprising:
a first end plate dimensioned for securement to the associated vehicle structure;
a second end plate attached in substantially fixed relation to said first end plate such that a mounting cavity is disposed therebetween;
a connector housing having a longitudinal axis and being at least partially disposed within said mounting cavity, said connector housing dimensioned for operative connection to the associated gas spring and damper assembly;

a first bearing assembly operatively disposed between said connector housing and said first end plate and transferring forces acting therebetween; and, a second bearing assembly operatively disposed between said connector housing and said second end plate and transferring forces acting therebetween.

2. A mounting assembly according to claim 1, wherein said first bearing assembly includes a first bearing ring disposed toward said first end plate, a second bearing ring disposed toward said connector housing and a slide bearing ring disposed between said first and second bearing rings such that said first and second bearing rings are rotatable relative to one another about said longitudinal axis with sliding engagement of said slide bearing ring against at least one of said first and second bearing rings.

3. A mounting assembly according to claim 2, wherein said first bearing ring is supported in substantially-fixed relation along said first end plate relative thereto and/or said second bearing ring is supported in substantially-fixed relation along said connector housing relative thereto.

4. A mounting assembly according to claim 1, wherein said first bearing assembly includes an NVH isolator disposed between said first end plate and said connector housing.

5. A mounting assembly according to claim 1, wherein said first bearing assembly substantially-exclusively transfers unidirectional compressive forces acting between said connector housing and said first end plate.

6. A mounting assembly according to claim 1, wherein said second bearing assembly includes a first bearing ring disposed along said second end plate, a second bearing ring disposed along said connector housing and a slide bearing ring disposed between said first and second bearing rings such that said first and second bearing rings are rotatable relative to one another about said longitudinal axis with sliding engagement of said slide bearing ring against at least one of said first and second bearing rings.

7. A mounting assembly according to claim 6, wherein said first bearing ring of said second bearing assembly is supported in substantially-fixed relation along said second end plate relative thereto and/or said second bearing ring of said second bearing assembly is supported in substantially-fixed relation along said connector housing relative thereto.

8. A mounting assembly according to claim 1, wherein said second bearing assembly includes an NVH isolator disposed between said second end plate and said connector housing.

9. A mounting assembly according to claim 1, wherein said second bearing assembly substantially-exclusively transfers unidirectional compressive forces acting between said connector housing and said second end plate.

10. A mounting assembly according to claim 1, wherein said first and second bearing assemblies are compressively preloaded against said connector housing between said first and second end plates.

11. A mounting assembly according to claim 1, wherein said first end plate includes a first plate wall with a first outer peripheral wall portion and said second end plate includes a second plate wall with a second outer peripheral wall portion, and said first and second end plates are attached in substantially-fixed relation to one another by forming a section of said first outer peripheral wall portion of said first plate wall around a section of said second outer peripheral wall portion.

12. A mounting assembly according to claim 11, wherein said first plate wall includes a first mounting wall portion oriented transverse to said longitudinal axis and disposed radially inward of said first outer peripheral wall portion, said second plate wall includes a second mounting wall portion oriented transverse to said longitudinal axis and disposed radially inward of said second outer peripheral wall portion with said first and second mounting wall portions disposed in abutting engagement with one another.

13. A gas spring and damper assembly comprising:
a mounting assembly according to claim 1;
a damper assembly having a longitudinal axis and including:
a damper housing at least partially defining a damping chamber containing a quantity of damping fluid; and,
a damper rod assembly operatively engaged with said damper housing for reciprocal displacement relative thereto and operatively supported on said connector housing of said mounting assembly; and,
a gas spring assembly disposed in axially coextensive relation with at least a portion of said damper assembly, said gas spring assembly including:
a flexible spring member extending peripherally about said longitudinal axis and longitudinally between opposing first and second ends such that a spring chamber is at least partially defined therebetween;
a first end member supported on said damper housing and operatively secured across said first end of said flexible spring member such that a substantially fluid-tight connection is formed therebetween; and,
a second end member operatively supported on said connector housing of said mounting assembly, said second end member extending across said second end of said flexible spring member such that a substantially fluid-tight connection is formed therebetween.

14. A gas spring and damper assembly according to claim 13 further comprising a first seal fluidically disposed between said connector housing and said second end member such that said spring chamber is substantially fluidically-isolated from said first and/or second bearing assemblies.

15. A gas spring and damper assembly according to claim 14, wherein said second end member is supported in a substantially-fixed position along said connector housing such that said first seal substantially operates as a static seal.

* * * * *